(12) United States Patent
Hande et al.

(10) Patent No.: US 10,320,771 B2
(45) Date of Patent: Jun. 11, 2019

(54) SINGLE SIGN-ON FRAMEWORK FOR BROWSER-BASED APPLICATIONS AND NATIVE APPLICATIONS

(71) Applicant: VMware, Inc., Palo Alto, CA (US)

(72) Inventors: Yogesh Govind Hande, Sandy Springs, GA (US); Shravan Shantharam, Cumming, GA (US); Kalyan Regula, Alpharetta, GA (US); Varun Murthy, Atlanta, GA (US); Bhuvanesh Shanmuga Sundaram, Atlanta, GA (US); Jonathon Deriso, Suwanee, GA (US)

(73) Assignee: Airwatch LLC, Atlanta, GA (US)

( * ) Notice: Subject to any disclaimer, the term of this patent is extended or adjusted under 35 U.S.C. 154(b) by 151 days.

(21) Appl. No.: 15/365,524

(22) Filed: Nov. 30, 2016

(65) Prior Publication Data

US 2018/0152439 A1    May 31, 2018

(51) Int. Cl.
*H04L 29/06* (2006.01)

(52) U.S. Cl.
CPC ........ *H04L 63/0815* (2013.01); *H04L 63/083* (2013.01); *H04L 63/10* (2013.01); *H04L 63/0435* (2013.01)

(58) Field of Classification Search
None
See application file for complete search history.

(56) References Cited

U.S. PATENT DOCUMENTS

| | | | |
|---|---|---|---|
| 8,261,087 B2 | 9/2012 | Fort et al. | |
| 8,296,828 B2 * | 10/2012 | Dalzell | G06F 21/41 713/168 |
| 9,813,400 B2 * | 11/2017 | Ross | H04L 63/08 |
| 2005/0060542 A1 * | 3/2005 | Risan | G06F 21/10 713/165 |
| 2006/0165060 A1 * | 7/2006 | Dua | G06Q 20/20 370/352 |
| 2007/0234408 A1 * | 10/2007 | Burch | G06F 21/31 726/6 |
| 2008/0222713 A1 | 9/2008 | Barnabo et al. | |
| 2011/0067095 A1 * | 3/2011 | Leicher | H04L 63/06 726/10 |
| 2012/0072979 A1 * | 3/2012 | Cha | G06F 21/34 726/7 |

(Continued)

OTHER PUBLICATIONS

Khattak, Zubair Ahmad, et al. Security, Trust and Privacy (STP) Framework for Federated Single Sign-on Environment. ICIMU 2011 : Proceedings of the 5th International Conference on Information Technology & Multimedia. https://ieeexplore.ieee.org/stamp/stamp.jsp?tp=&arnumber=6122770 (Year: 2011).*

(Continued)

*Primary Examiner* — Jeremiah L Avery
(74) *Attorney, Agent, or Firm* — Thomas | Horstemeyer, LLP (57) ABSTRACT

Disclosed are various approaches for providing single sign-on capabilities for a user on a client device. A user's credentials can be authenticated by an identity provider application. The identity provider application can facilitate single sign-on capabilities for browser-based applications and native applications on the client device.

17 Claims, 6 Drawing Sheets

(56) References Cited

U.S. PATENT DOCUMENTS

| | | | |
|---|---|---|---|
| 2012/0323717 A1* | 12/2012 | Kirsch | G06Q 20/0855 705/26.1 |
| 2013/0125226 A1* | 5/2013 | Shah | H04L 63/0815 726/7 |
| 2013/0219456 A1* | 8/2013 | Sharma | H04L 63/0815 726/1 |
| 2013/0262857 A1* | 10/2013 | Neuman | H04L 63/08 713/155 |
| 2014/0020073 A1* | 1/2014 | Ronda | G06F 21/31 726/7 |
| 2014/0082715 A1 | 3/2014 | Grajek et al. | |
| 2014/0189808 A1* | 7/2014 | Mahaffey | H04L 63/083 726/4 |
| 2014/0208407 A1 | 7/2014 | VanBlon et al. | |
| 2015/0200959 A1 | 7/2015 | Adam | |
| 2015/0244706 A1* | 8/2015 | Grajek | H04L 63/0815 726/6 |
| 2016/0112402 A1* | 4/2016 | Schwartz | H04L 63/0815 726/8 |
| 2017/0006008 A1* | 1/2017 | Moran | H04L 63/08 |

OTHER PUBLICATIONS

Lin, Ping, et al. Single Sign-On for Multiple Unified Communications Applications. World Congress on Internet Security (WorldCIS-2012). https://ieeexplore.ieee.org/stamp/stamp.jsp?tp=&arnumber=6280209 (Year: 2012).*

Binu, Sumitra, et al. A Single Sign on Based Secure Remote User Authentication Scheme for Multi-Server Environments. International Conference on Computing and Communication Technologies. https://ieeexplore.ieee.org/stamp/stamp.jsp?tp=&arnumber=7066715 (Year: 2015).*

Sliwa, Joanna, et al. Efficiency of the Single Sign on mechanism in a tactical network environment. 2015 International Conference on Military Communications and Information Systems (ICMCIS). https://ieeexplore.ieee.org/stamp/stamp.jsp?tp=&arnumber=7158690 (Year: 2015).*

International Search Report dated Feb. 21, 2018 for Application No. PCT/US2017/063983.

Office Action dated May 10, 2018 for U.S. Appl. No. 14/498,115.

* cited by examiner

SINGLE SIGN-ON FRAMEWORK FOR BROWSER-BASED APPLICATIONS AND NATIVE APPLICATIONS

CROSS-REFERENCE TO RELATED APPLICATIONS

This application is related to application Ser. No. 15/365,524, entitled SINGLE SIGN-ON FRAMEWORK FOR BROWSER-BASED APPLICATIONS AND NATIVE APPLICATIONS filed on Nov. 30, 2016.

BACKGROUND

Enterprises often deploy applications to client devices such as smartphones, personal computers, or laptops. Enterprises also deploy or utilize an identity provider to authenticate access to applications installed on a client device or to authenticate access to a cloud-based service. For example, an enterprise might deploy a browser-based mail or productivity service for which access is authenticated by or federated to the identity provider server.

In some operating system environments, such as Windows 10®, the application programming interfaces (API's) provided by the operating system allow an application to register as a local identity provider for certain contexts. In one example, such as in the Windows 10® environment, an application can register as a local identity provider for requests made to a particular uniform resource identifier (URI). In this scenario, other applications and services can federate authentication by an identity provider server identified by the URI to the local identity provider.

For example, an identity provider, when published in an application distribution repository associated with the operating system, can identify a particular URI or uniform resource locator (URL) for which it is registered as a local identity provider application that can be installed on a user's device. When the application is installed on a user's device, the identity provider application registers as the local identity provider for a particular URI. Accordingly, if another application installed on the client device or an identity provider server makes a request through the operating system of the client device to authenticate a particular user, the local identity provider can handle and/or respond to such a request.

However, even with the capability of a local identity provider registration provided by Windows 10®, there does not exist a framework in which single sign-on can be accomplished for native and web-based applications. Under the current framework, users may have to authenticate for web-based applications and authenticate for native applications, which means that true single sign-on for the user's identity has not been achieved in a Windows 10® environment.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are examples of a framework that facilitates single sign-on capability for a user for various applications and services to which access is determined based upon the user's identity or account within an identity provider. For example, a user within an enterprise might use or be issued a device on which the user can access various applications and services that are associated with or provided by the enterprise. The user's device might have a productivity suite of applications, a time-keeping application, a collaboration application, or any other application issued by an enterprise to the user for various reasons. The user might also access web-based applications from the device, where the web-based applications are accessed using a browser application and are also associated with the enterprise.

Access to these applications and services can be dependent upon a user having an account within a particular enterprise. The various applications and services associated with the user's account within the enterprise can federate or delegate authentication of the user's identity to an identity provider server deployed by or on behalf of the enterprise. Without single sign-on capabilities, the user might be required to provide a username and password, which would be verified by the identity provider server, each time the user accesses a different application or service. Requiring multiple and repeated authentication of the user's identity to access different applications and services deployed on the device can result in a less than desirable user experience.

Accordingly, in some operating system environments, such as Windows 10®, certain features are provided that can facilitate limited single sign-on capabilities. For example, Windows 10® provides application programming interfaces (APIs) that allow an application to register as a local identity provider for a particular identity provider server that is identified by a uniform resource indicator (URI) or uniform resource locator (URL). In the Windows 10® context, an application can register as the web account provider for a particular context (e.g. a URI). The URI must be declared when the application is published under certain operating system constraints. Calls to authenticate a user can be made by other applications to the web account provider through an operating system API call with a given URI provided as a context so that the operating system can route the call to the correct local identity provider. A local identity provider can also utilize a universal cookie jar or token store that is provided by the operating system, which is a place where authentication tokens or cookies can be stored by various applications and accessed through operating system APIs.

Accordingly, in one example, an identity provider application can be published and registered as a local identity provider when installed on a client device. When the user launches the identity provider application on the client device, the user is prompted to provide credentials associated with his or her account. The identity provider application can authenticate the user's credentials with an identity provider server and store an authentication token received from the identity provider server in the token store maintained by the operating system. The authentication token can be used to authenticate a user's subsequent access to the application or services.

In other examples, a native application can be instrumented to initiate a secure communication session with the identity provider application. The application can be validated as an approved or authorized application by the identity provider application. The identity provider application can then obtain an authentication key, such as a hash message authentication code (HMAC) token, from an identity provider server, which can be provided to the application through the secure communication session and used by the application for subsequent attempts to authenticate the application with the identity provider server.

Figure 1:
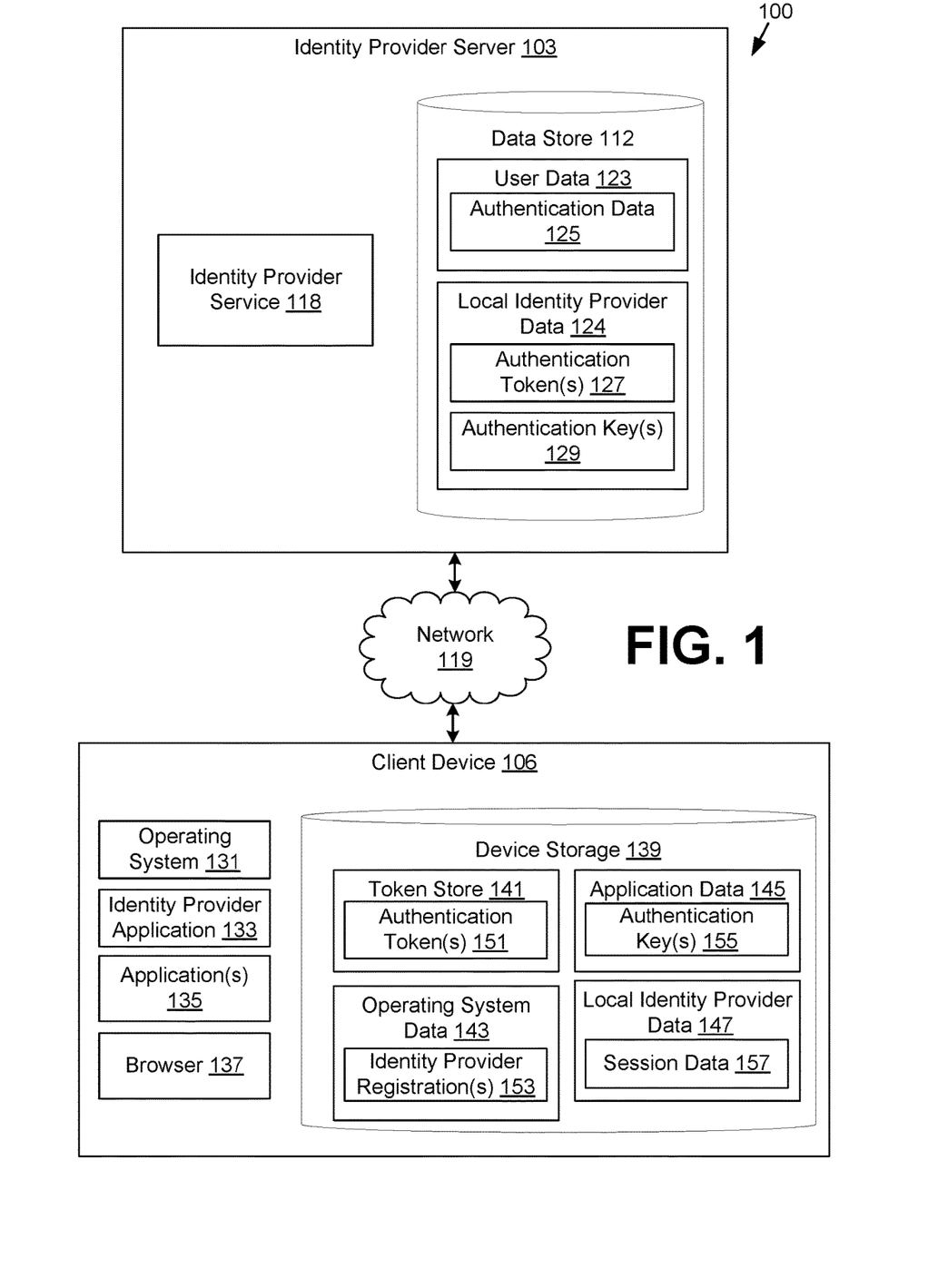
FIG. 1 is a schematic block diagram depicting an example implementation according to various examples of the disclosure.

FIG. 1 illustrates an example of a networked environment 100 according to examples of the disclosure. In the depicted network environment 100, an identity provider server 103 is in communication with at least one client device 106 over a network 119.

The network 119 includes the Internet, intranets, extranets, wide area networks (WANs), local area networks (LANs), wired networks, wireless networks, other suitable networks, or any combination of two or more such networks. The networks can include satellite networks, cable networks, Ethernet networks, and other types of networks.

The identity provider server 103 can be a cloud computing environment or a computing environment that is operated by or on behalf of an enterprise, such as a business or other organization. The identity provider server 103 includes a computing device, such as a server computer, that provides computing capabilities. Alternatively, the identity provider server 103 can employ multiple computing devices that are arranged in one or more server banks or computer banks. In one example, the computing devices can be located in a single installation. In another example, the computing devices for the identity provider server 103 can be distributed among multiple different geographical locations. In one case, the identity provider server 103 includes multiple computing devices that together can form a hosted computing resource or a grid computing resource. Additionally, the identity provider server 103 can operate as an elastic computing resource where the allotted capacity of computing-related resources, such as processing resources, network resources, and storage resources, can vary over time. In other examples, the identity provider server 103 can include or be operated as one or more virtualized computer instances that can be executed to perform the functionality that is described herein.

Various applications or other functionality can be executed in the identity provider server 103. Also, various data can be stored in a data store 112 that can be accessible to the identity provider server 103. The data store 112 can be representative of a plurality of data stores 112. The data stored in the data store 112 can be associated with the operation of the various applications or functional entities described below.

The components executed on the identity provider server 103 can include an identity provider service 118 and other applications, services, processes, systems, engines, or functionality not discussed in detail herein. The identity provider service 118 can carry out federated or delegated user authentication on behalf of an enterprise. For example, the identity provider service 118 can implement OAuth, SAML, tbauth, or similar protocols that allow for federated or delegated user authorization or authentication. For example, the identity provider service 118 can obtain an authentication request from a client device 106, which can contain the user credentials of a user account. The identity provider service 118 can verify the credentials of the user and either accept or reject authentication of the user. In response to a successful authentication of a user, the identity provider service 118 can provide an authentication token, certificate, key or any other authentication artifact to a requesting client device 106 based upon a selected authentication protocol.

In examples of this disclosure, the identity provider service 118 can obtain an authentication request from the identity provider application 133 or a browser 137 executing on a client device 106. Depending upon the type of authentication request as well as which type of application is submitting the request, the identity provider service 118 can provide an appropriate response. In one scenario, a browser 137 can submit an authentication request to the identity provider service 118. In this example, the authentication request can take the form of a user navigating to a web page that redirects the browser 137 to a login or authentication page generated by the identity provider service 118. The login or authentication page can determine from the authentication request whether the operating system 131 of the client device 106 supports a particular authentication protocol, such as tbauth.

If the operating system 131 supports tbauth, the identity provider service 118 can generate and transmit a tbauth request to the client device 106. The tbauth request is received by the browser 137 or operating system 131 and redirected or forwarded to an identity provider application 133, which can provide an indication of whether a particular user account has been authenticated on the client device 106 to the identity provider service 118. This particular authentication flow is shown and discussed in further detail in the discussion of FIG. 2.

In an alternative authentication scenario, an application 135 installed on the client device 106 can validate itself with the identity provider application 133. The identity provider application 133 can validate an installation of an application 135 by verifying that the package family name, or any other indication of the publisher of the application, is a whitelisted package family name. Next, if a user has previously authenticated a user account within the identity provider server 103, the identity provider application 133 can request and obtain an authentication key from the identity provider service 118, which the application 135 can use to authenticate itself to the identity provider service 118 in subsequent communications. This alternative authentication flow is shown and discussed in further detail in the discussion of FIG. 3.

The data stored in the data store 112 can include user data 123 and local identity provider data 124. User data 123 contains information about users who are associated with a user account within the enterprise or within the identity provider server 103 associated with an enterprise. User data 123 can include profile information about a user, information about client devices 106, such as a device identifier of client devices 106 that is associated with or assigned to the user. User data 123 can also include authentication data 125. Authentication data 125 includes information with which a user identity or user account within the identity provider server 103 can be verified. Authentication data 125 can include a username or other user identifier, passwords, multi-factor authentication data, or security certificates.

Local identity provider data 124 can include information about identity provider applications 133, applications 135, as well as client devices 106 on which various instances of the identity provider application 133 and applications 135 are installed. Local identity provider data 124 can include authentication tokens 127 that are generated by the identity provider service 118 and issued to client devices 106, or an instance of the identity provider application 133 or other applications 135 executed by the client device 106. An authentication token 127 can include an OAuth token, a cookie, a SAML token in various examples. The authentication token 127 can be provided to the identity provider application 133 and stored by the identity provider application 133 on the client device 106 to facilitate single sign-on capabilities when browser-based user authentication utilizing tbauth is employed.

Authentication keys 129 can include other token or keys that are generated by the identity provider service 118 and issued to client devices 106, or an instance of the identity provider application 133 or other applications 135 executed by the client device 106. An authentication key 129 can include an HMAC token or key generated by the identity provider service 118 in response to the identity provider application 133 requesting an authentication key 129 on behalf of an installation of an application 135. The authentication key 129 can be used by the application 135 to authenticate itself to the identity provider service 118 in subsequent communications. The authentication token 129 can be provided to the identity provider application 133 and stored by the identity provider application 133 or by the application 135 to which it corresponds on the client device 106 to facilitate single sign-on capabilities.

The client device 106 can represent multiple client devices 106 coupled to the network 119. The client device 106 includes, for example, a processor-based computer system. According to various examples, a client device 106 can be in the form of a desktop computer, a laptop computer, a personal digital assistant, a mobile phone, a smartphone, or a tablet computer system. The client device 106 can represent a device that is owned or issued by the enterprise to a user or a device that is owned by the user.

The client device 106 executes an operating system 131 that provides APIs that examples of this disclosure can utilize to facilitate single sign-on capabilities. In examples of this disclosure, an identity provider application 133 can be installed on the client device 106 and published in an application distribution repository associated with the operating system 131. In one example, the identity provider application 133 can be signed by a publisher or developer with a certificate. The identity provider application 133, when installed on the client device, can also register as a local identity provider for a particular identity provider server 103 that is located at a particular URI. In the Windows 10® context, the identity provider application 133 can register as a web account provider for a particular identity provider server located at a specified URI. In the Windows 10® framework, the URI must be specified when the application is published by the application developer in the application distribution repository.

One or more applications 135 can be installed on the client device 106. Applications 135 can be obtained from an application distribution repository or obtained and installed through another mechanism on the client device 106. In either scenario, an application 135 is identified by a package family name or a bundle identifier that identifies the publisher of the application as well as the identity of the application. The application 135 can also be signed by a particular developer certificate to ensure the authenticity of the package family name or bundle identifier. The browser 137 represents a browser application that can be used by a user to access web-based applications over the network 119. In some examples, authentication of the user's identity and the device's permission to access a particular application 135 or a service over the network 119 can be verified by the identity provider application 133 in conjunction with the identity provider service 118.

The client device 106 can also include device storage 139, which can be mass storage resources of the client device 106. The device storage 139 can include private storage areas that only certain applications or certain operating system components can access. For example, the token store 141 can be a storage area on the client device 106 in which authentication tokens 151 that are obtained from various identity provider servers 103 or other types of websites can be stored by the operating system 131. In the Windows 10® example, the token store 141 can be thought of as a universal cookie jar or the storage area for the web account manager API provided by the operating system 131. The token store 141 can be accessed through an API provided by the operating system 131. In the Windows 10® context, requests to access the token store 141 through the operating system 131 APIs can be considered an insecure communication mechanism.

The operating system data 143 can include various parameters and properties associated with the operating system 131. In some examples, the operating system data 143 can be a system registry or system settings of the operating system 131. In the context of this disclosure, the operating system data 143 can include one or more identity provider registrations 153. An identity provider registration 135 can be created by the operating system 131 when an identity provider application 135 is installed on the client device 106 and registers as a local identity provider for a particular URI or context. The identity provider application 133 can register within the operating system 131 as the local identity provider for a particular URI so that when a browser 137 or another application 135 requests an authentication token 151 from the token store 141 that corresponds to the URI, the operating system 131 can invoke the identity provider application 133 and task it with delivering the requested authentication token 151 to the requesting application 135 through the operating system 131. In many cases, the requesting application 135 is the browser 137.

Application data 145 can be a storage area within device storage 139 that has storage areas that are specific to the applications 135 that are installed on the client device 106. The identity provider application 133 and the browser 137 can also be assigned a storage area within application data 145. Application data 145 can include settings and preferences that are specific to particular applications 135. Additionally, application data 145 can include a private storage area for each application 135 that only a particular application 135 can access. Accordingly, the application data 145 for a particular application can include an authentication key 155, such as an HMAC token, that is obtained by the identity provider application 133 on behalf of an application 135 from the identity provider service 118.

The local identity provider data 147 represents additional data that the identity provider application 133 can store to facilitate single sign-on capabilities as described herein. The local identity provider data 147 can include an authentication token 151 or authentication key 155 generated by the identity provider service 118 and issued to the identity provider application 133 so that the identity provider application 133 can authenticate itself to the identity provider service 118. In one example, the identity provider application 133 can use an authentication key 155 issued by the identity provider service 118 to authenticate itself in communications between the identity provider application 133 and identity provider service 118. In some examples, the identity provider service 118 can issue the authentication key 155 after an initial authentication of a user account through to the identity provider application 133. The identity provider service 118 can also periodically expire any authentication key 155 or authentication token 151, which can require the user to authenticate his or her credentials again through the identity provider application 133.

Session data 157 can include data associated with secure communication sessions that are established between the identity provider application 133 and other applications 135. The session data 157 can include a session identifier, a symmetric key or data from which a symmetric key can be generated, and a package family name of an application 135 with which a session is established by the identity provider application 133. A secure communication session can be established between the identity provider application 133 and another application 135 that is whitelisted as an approved application so that an authentication key 155 obtained by the identity provider application 133 on behalf of the application 135 can be provided in a secure manner.

Figure 2:
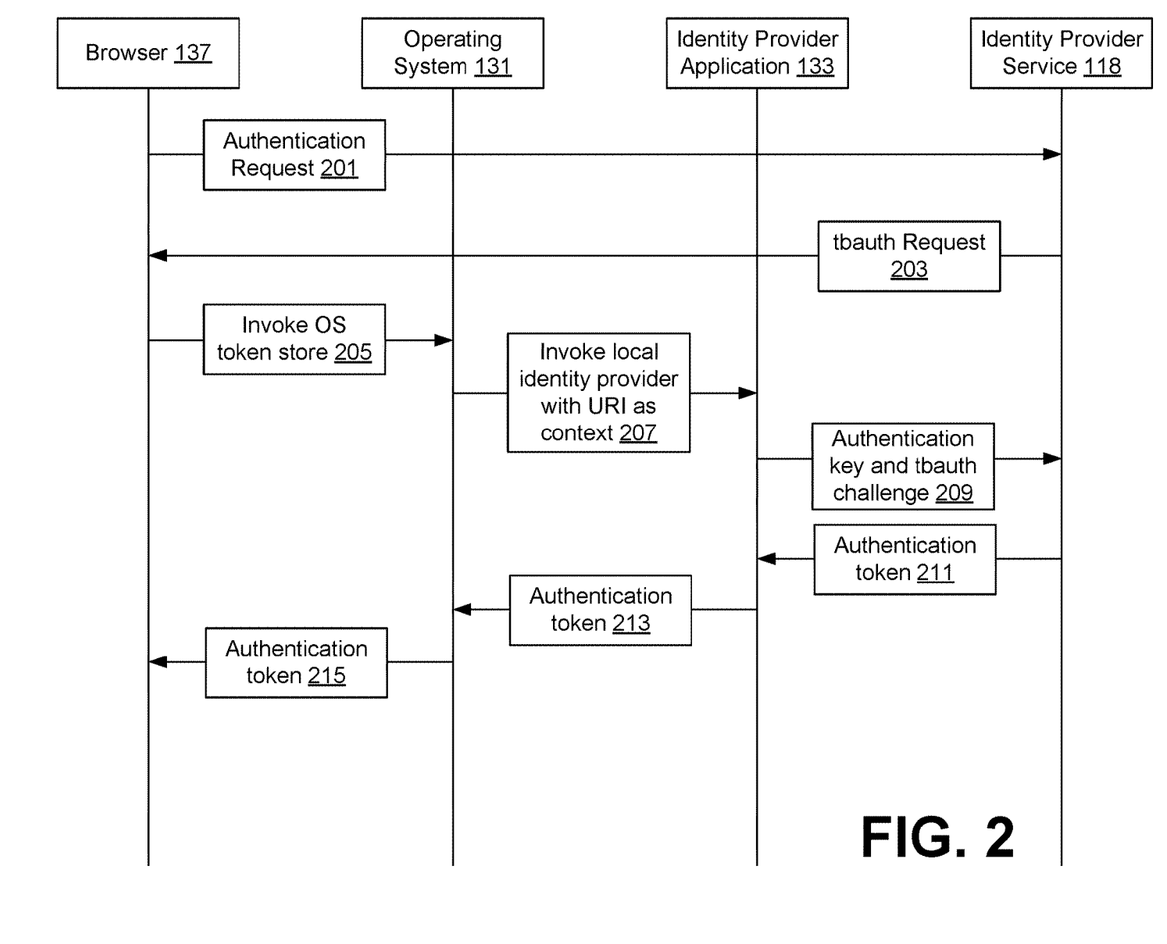
FIG. 2 is a sequence diagram illustrating functionality according to a first example of the disclosure.

FIG. 2 illustrates a sequence diagram that illustrates interactions between the various applications and services shown in the networked environment 100 of FIG. 1. FIG. 2 illustrates how the identity provider application 133 can facilitate single sign-on capability for browser-based applications or browser-based authentication of a user. Accordingly, by utilizing the framework as disclosed herein, single sign-on of browser-based applications can be provided once a user performs an initial authentication to the identity provider application 133. The initial authentication can take the form of a login page or login user interface in which the user enters a username, password, multi-factor authentication code, or required other authentication credential. The identity provider application 133 can then obtain an authentication token 151 and/or authentication key 155 that it can use to authenticate itself to the identity provider service 133 for subsequent communications. This initial authentication can be performed upon launching of the identity provider application 133 or upon adding a user account to the identity provider application 133.

Accordingly, assuming that an initial user authentication has occurred using the identity provider application 133, reference is now made to the sequence diagram of FIG. 2, where the user's identity can be verified in a browser-based application or browser-based authentication utilized by an application 135. As shown in FIG. 2, an authentication request is transmitted to the identity provider service 118 at step 201. The authentication request can be generated by or on behalf of a browser 137 on the client device 106. The authentication request can take the form of a user opening a website or a link to a website that requires federated or delegated user authentication by the identity provider service 118. In this scenario, the website can redirect the browser 137 to a login page, a network address or network port on which the identity provider service 118 is listening.

Upon receiving the authentication request, the identity provider service 118 can determine whether an operating system 133 parameter or a browser 137 parameter embedded in the authentication request corresponds to one that supports tbauth. For example, if the identity provider service 118 determines that the client device 106 is running Windows 10, the identity provider service 118 can issue a tbauth request to the browser 137 at step 203. The tbauth request can include an authentication challenge that is generated by the identity provider service 118. The authentication challenge can be unique to the communication session between the browser 137 and identity provider service 118. The tbauth request can also include a context parameter that corresponds to the URI for which the identity provider application 133 is published and registered as the local identity provider on the client device 106.

Because the operating system 133 and browser 137 are determined to support tbauth requests at step 203, the browser 137, upon receiving the tbauth request, can invoke the token store 141 at step 205. The token store 141 can be invoked by the browser 137 because the browser 137, owing to its support of the tbauth protocol, can request an authentication token 151 from the operating system 133 and provide the tbauth request from the identity provider service 118 as a part of the request. As noted above, the tbauth request can include an authentication challenge that was embedded in the tbauth request by the identity provider service 118.

At step 207, according to the tbauth protocol the operating system 131 can identify from the URI in the tbauth request whether there is a local identity provider that corresponds to the URI. As noted above, the identity provider application 133, when installed on the client device 106, registers as the local identity provider for the URI. Accordingly, the operating system 131 passes the tbauth request, along with the authentication challenge that is embedded within the tbauth request, to the identity provider application 133 at step 207.

At step 209, the identity provider application 133 can provide an authentication key 151 issued to the identity provider application 133 upon the initial authentication of the user and the authentication challenge from the tbauth request to the identity provider service 118. The identity provider service 118 can authenticate the identity provider application 133 by verifying that the authentication key 151 presented by the identity provider application 133 corresponds to the authentication key 129 generated by identity provider service 118 and presented to the identity provider application 133 upon initial authentication of the user. The identity provider service 118 can also verify that the authentication challenge received from the identity provider application 133 matches the authentication challenge embedded by the identity provider service 118 in the tbauth request sent to the browser 137.

Upon verifying the authentication key 151 and authentication challenge, the identity provider service 118 can transmit an authentication token 149 to the identity provider application 133 in step 211. The authentication token 149 is provided in response to the identity provider application 133 providing the correct authentication challenge and an authentication key 151 that verifies the identity of the identity provider application 133 as having performed an initial authentication of the user. In some examples, the authentication token 149 can be cached by the identity provider application 133 in the token store 141 or elsewhere on the client device 106 so that the identity provider application 133 need not request the authentication token 149 from the identity provider service 118 in this scenario.

At step 213, the identity provider application 133 can provide the authentication token 149 to the operating system 131. In some examples, the operating system 131 can store the authentication token 149 into the token store 141 or universal cookie jar on the client device 106. At this step, the authentication token 149 is provided to the operating system 131 in response to the operating system 131 invoking the identity provider application 133 the local identity provider for the URI in the tbauth request forwarded from the browser 137.

At step 215, the authentication token 149 can be provided by the operating system 131 to the browser 137. The browser 137 can then use the authentication token 149 to authenticate its interactions with the identity provider service 118 or another service that has federated or delegated authentication to the identity provider service 118. In one example, upon providing the authentication token 149 back to the identity provider service 118, the identity provider service 118 can redirect the browser 137 to a web-based service that uses the identity provider service 118 to authenticate access to the service.

Figure 3:
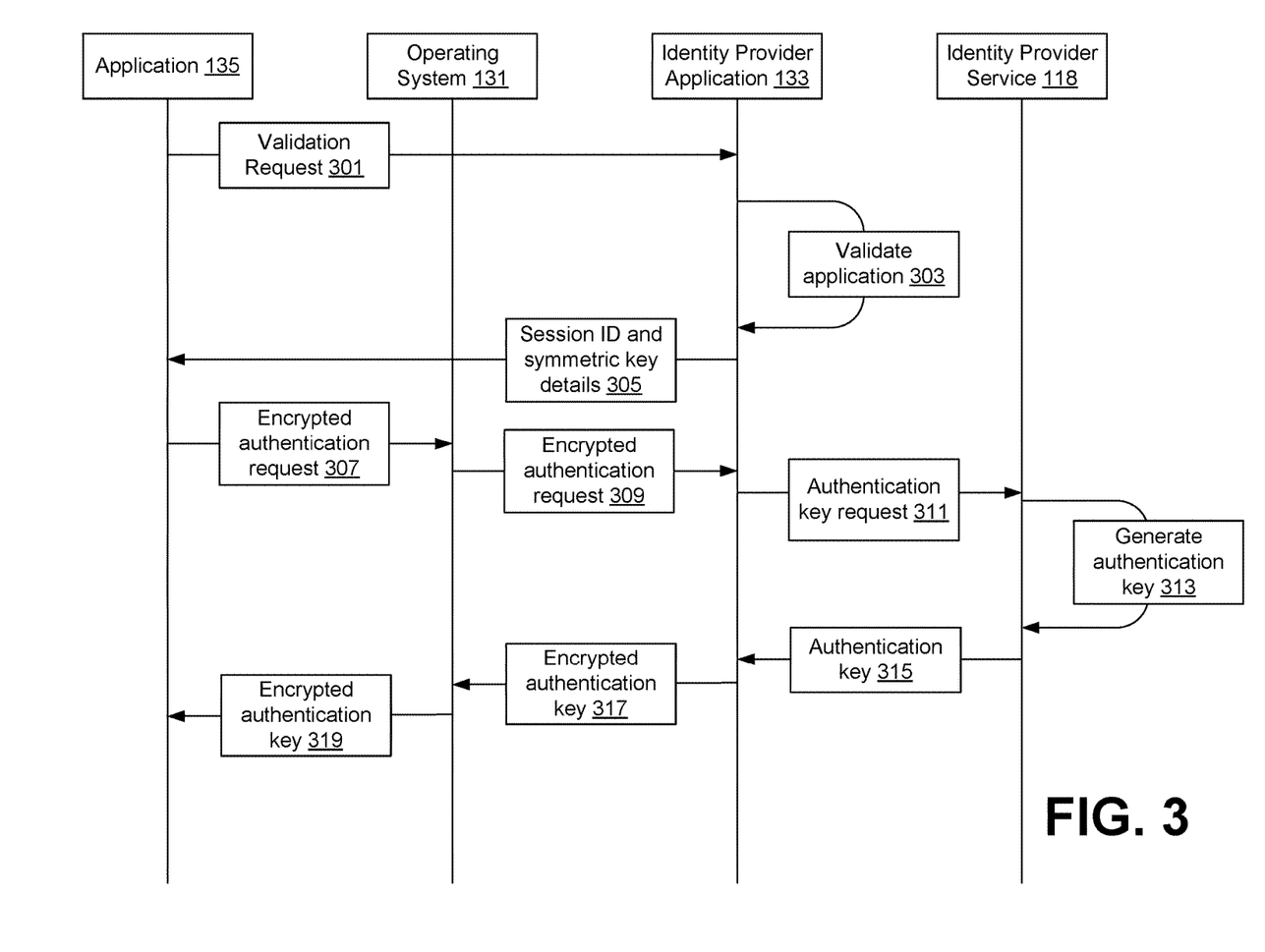
FIG. 3 is a sequence diagram illustrating functionality according to a second example of the disclosure.

FIG. 3 illustrates a sequence diagram that illustrates interactions between the various applications and services shown in the networked environment 100 of FIG. 1. FIG. 3 illustrates how the identity provider application 133 can facilitate single sign-on capability for native applications 135 that are executed by the client device 106. Accordingly, by utilizing the framework as disclosed herein, single sign-on of browser-based applications as well as native applications 135 can be provided once a user performs an initial authentication to the identity provider application 133. As noted above, the initial authentication can take the form of a login page or login user interface in which the user enters a username, password, multi-factor authentication code, or required other authentication credential. The identity provider application 133 can then obtain an authentication token 151 and/or authentication key 155 that it can use to authenticate itself to the identity provider service 133 for subsequent communications. This initial authentication can be performed upon launching of the identity provider application 133 or upon adding of a user account to the identity provider application 133. In this way, single sign-on between browser 137 based applications and native applications 135 is provided.

First, at step 301, an application 135 installed on the client device 106 that is downloaded from an application distribution repository can send a validation request to the identity provider application 133. The validation request can be sent using an app-to-app messaging protocol provided by the operating system 131. In some examples, certain app-to-app messaging protocols require that the package family name or another identifier for the installation of the identity provider application 133 be provided so that messaging can be routed correctly. The validation request can include the package family name, a publisher or developer identifier, or any other identifying information about the sending application 135.

Upon receiving the validation request, the identity provider application 133 can validate the application at step 303. In some examples, the identity provider application 133 can be configured with a whitelist of applications 135 that should be issued an authentication key 151 once an initial authentication of a user is performed. In some examples, an application 135 can be issued an authentication key 151 that is used by the application 135 to authenticate subsequent communications with the identity provider service 118 or other network-accessible services. Accordingly, the identity provider application 133 can determine whether the package family name, developer or publisher identifier, or other identifying information embedded in the validation request matches an application that appears on the whitelist.

The identity provider application 133 can also generate a session along with a session identifier that corresponds to the session. The identity provider application 133 can further generate a symmetric key that can be used to secure subsequent communications between the application 135 and the identity provider application 133 through an operating system API call that is not a secure messaging protocol.

Upon validating the application, the identity provider application 133 can respond to the validation request at step 305, where a session identifier and symmetric key details are sent to the application 135. The identity provider application 133 can send the session identifier and symmetric key details using an app-to-app messaging protocol provided by the operating system 131 in which the package family name of the sending application and the receiving application are embedded into the message. Security of the message is presumed because the messaging is routed through an app-to-app operating system 131 messaging protocol in which messages are only accessible by the sending and receiving application 135. The security key information can be a symmetric key or data from which a symmetric key can be generated by the application 135.

At step 307, the application 135 can make an authentication request through an operating system API. In one example, the application 135 can invoke the token store 141 using an API in which the application can request an authentication key 151 for a particular URI. In the example of FIG. 3, the request can include a package family name and session identifier received in step 305. The request can also be encrypted using the symmetric key based upon the symmetric key details received from the identity provider application 133. In one example, the URI can be left unencrypted so that the operating system 131 can route the remaining encrypted data within the authentication request to the correct local identity provider.

At step 309, the operating system 133 can determine the local identity provider for the URI in the authentication request and route the encrypted authentication request 309 to the identity provider application 133. The encrypted authentication request can include the session identifier generated for the application 135 as well as the package family name of the application 135. The identity provider application 133 can decrypt and extract the package family name and session identifier. The identity provider application 133 can also verify that the package family name matches the data stored in the session created for the application 135. In this way, the identity provider application 133 can re-validate the application 135 and the encrypted authentication request.

At step 311, the identity provider application 133 can transmit an authentication key request to the identity provider service 118. The authentication key request can include a request to an authentication key 151 for the application 135 and an authentication key 151 corresponding to the identity provider application 133.

At step 313, the identity provider service 118 can verify the authentication key 151 of the identity provider application 133 and generate a new authentication key 129 for the application 135. The authentication key 129 can be stored in the data store 112 and associated with the client device 106 and the installation of the application 135 on the client device 106. The authentication key 151 can include an HMAC token, a certificate, a symmetric key, an asymmetric key pair, or an OAuth token or other form of token.

At step 315, the authentication key 151 is transmitted to the identity provider application 133. If at step 313 the identity provider application cannot be authenticated, the identity provider service 118 can transmit an error at step 315.

At step 317, the identity provider application 133 can encrypt the authentication key 151 and transmit the encrypted authentication key to the operating system 131.

The encrypted authentication key is sent to the operating system 131 in response to the operating system 131 requesting the authentication key 151 from the identity provider application 133.

At step 319, the encrypted authentication key is provided to the application 135. The application 135 can then decrypt the encrypted authentication key using the symmetric key obtained from the identity provider application 133. The authentication key 151 can be stored in the application data 145 for the application 133. The authentication key 151 can also be used by the application 133 to authenticate itself with the identity provider service 118.

Figure 4:
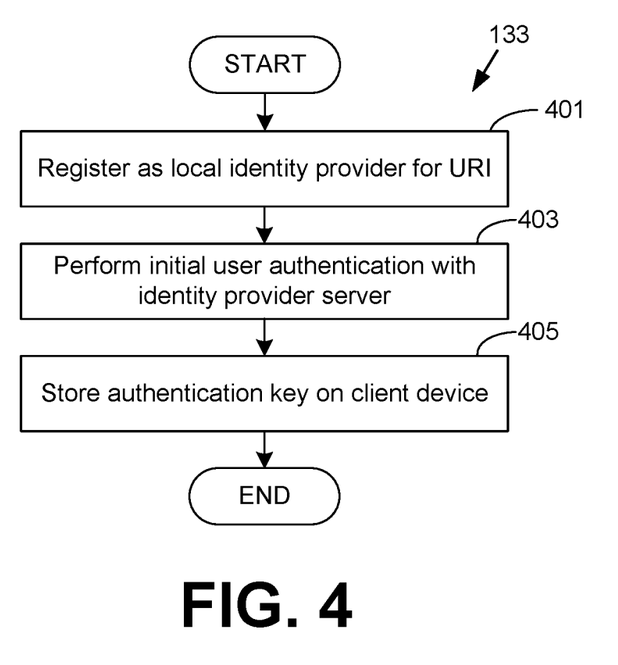
FIG. 4 is a flowchart that illustrates functionality according to a third example of the disclosure.

Referring next to FIG. 4, shown is a flowchart that provides one example of how the identity provider application 133 can perform an initial authentication of a user. The identity provider application 133 can be published in an application distribution repository as a local identity provider for a particular URI. Accordingly, at step 401, when the identity provider application 133 is launched or installed, the identity provider application 133 can register as a local identity provider for the URI. The URI can identity the identity provider server 103 by its network address. The identity provider application 133 can register as the local identity provider using APIs provided by the operating system 131 that allow a particular application to do so. Accordingly, if an application 135 subsequently requests an authentication token 149 or authentication key 151 through another API of the operating system 131, the request is forwarded to the identity provider application 133 by the operating system 131.

At step 403, the identity provider application 133 can perform an initial user authentication with the identity provider server 103. The initial user authentication can be performed by the identity provider application 133 by presenting a login user interface in which a user can enter a username and password. In some examples, a user might be required to provide a biometric authentication, a multi-factor authentication code, or a physical object with which the user can be authenticated, such as a keycard or USB dongle. The credentials can be presented by the identity provider application 133 to the identity provider service 118.

At step 405, after authentication of the user is performed, the identity provider application 133 can store an authentication key 151 obtained from the identity provider service 118 on the client device 106. The authentication key 151 can be issued by the identity provider service 118 to the identity provider application 133 in response to a successful authentication of the client device 106. The authentication key 151 for the identity provider application 133 can be stored within the token store 141 or the local identity provider data 147.

Figure 5:
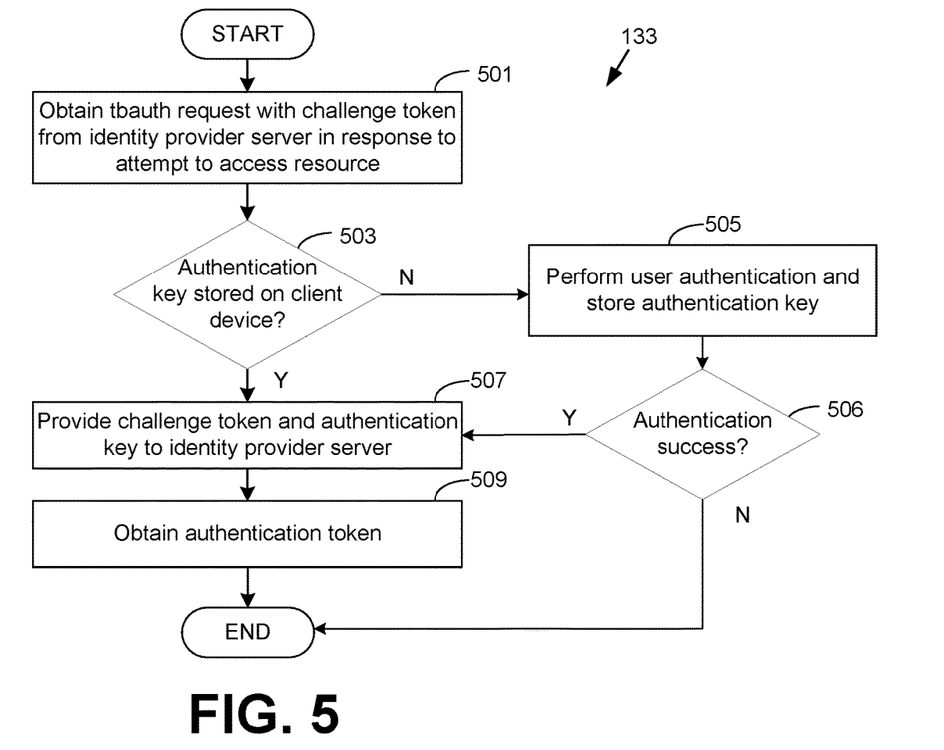
FIG. 5 is a flowchart that illustrates functionality according to a fourth example of the disclosure.

Referring next to FIG. 5, shown is a flowchart that provides one example of how the identity provider application 133 can facilitate single sign-on capabilities of a browser 137 based application after an initial authentication of a user. The flowchart of FIG. 5 assumes that an initial authentication of the user was performed and that the user has authenticated his or her identity to the identity provider application 133 and attempted to access a web-based service using the browser 137. Accordingly, at step 501, the identity provider application 133 can obtain a tbauth request that includes an authentication challenge from the identity provider service 118. The tbauth request can be received by way of the browser 137 and operating system 131 redirecting or forwarding the tbauth request to the identity provider application 133.

At step 503, the identity provider application can determine whether an authentication key 151 obtained after an initial authentication is stored on the client device 106.

At step 505, if there is no authentication key 151 stored on the client device at step 503 or if the authentication key 151 stored on the client device has expired, the identity provider application 133 can perform an initial user authentication and store the authentication key 151 on the client device 106. The process can then proceed to step 506.

At step 506, if the authentication at step 505 fails, the process can proceed to completion without returning an authentication token to the browser 137. In some examples, the identity provider application 133 can return an error to the browser 137 or to the operating system 131. If the authentication at step 505 succeeds or if an authentication key 151 corresponding to the identity provider application 133 is stored on the client device 106 at step 503, the process can proceed to step 507.

At step 507, the identity provider application 133 can provide the authentication key 151 issued by the identity provider service 118 and the authentication challenge embedded in the tbauth request to the identity provider service 118. The authentication key 151 is the key that was previously issued to the identity provider service 118 to authenticate the identity provider service 118 upon the initial authentication of the user.

At step 509, the identity provider application 133 can obtain an authentication token 149 from the identity provider service 118. The authentication token 149 can be stored in the token store 141 through an API provided by the operating system 131 or provided in response to an API call made through the operating system 131 to the browser 137. The browser 137 can then use the authentication token 149 to authenticate its interactions with the identity provider service 118 or another web-based service employing the identity provider service 118 for federated or delegated authentication. Thereafter, the process can proceed to completion.

Figure 6:
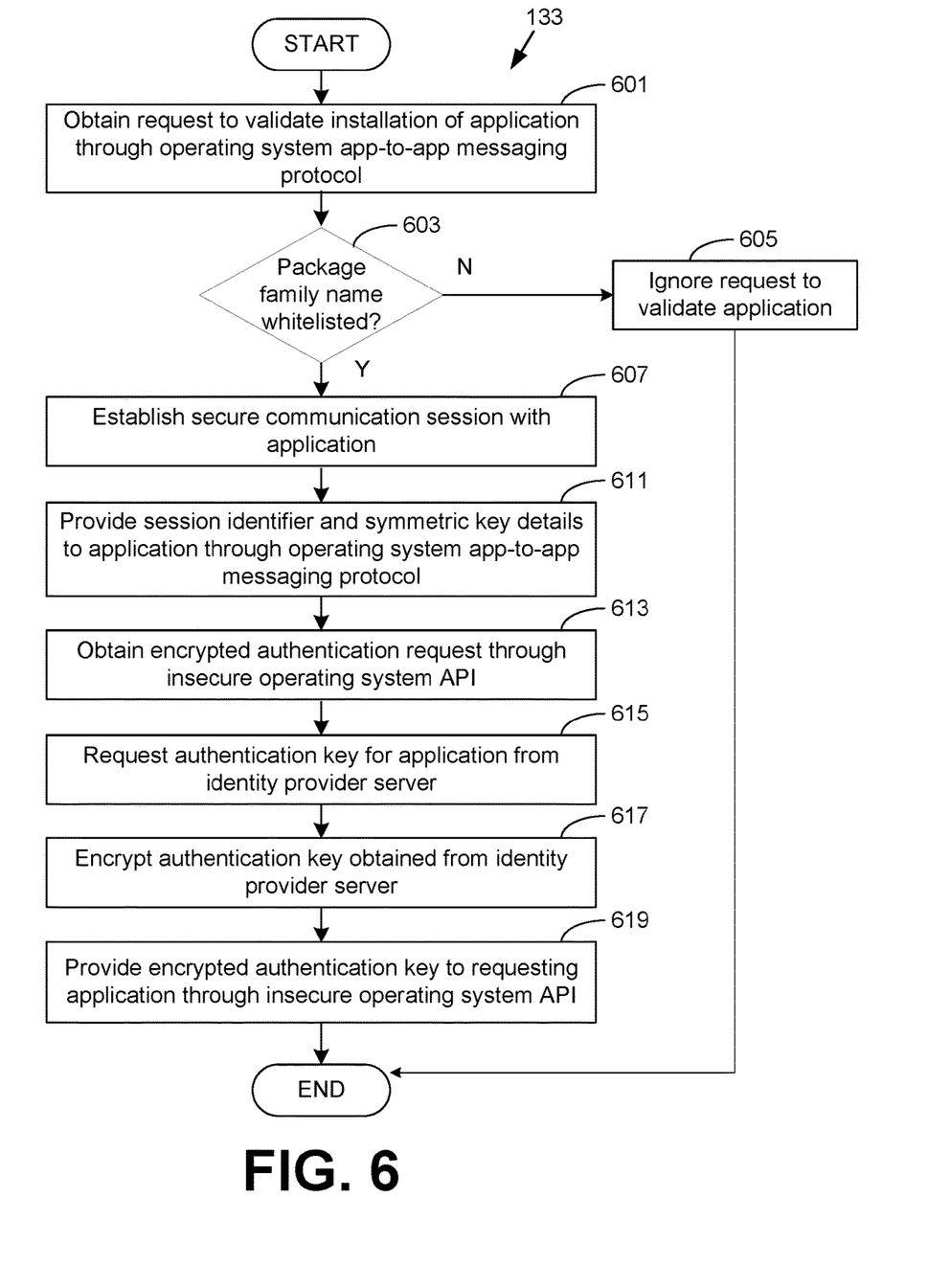
FIG. 6 is a flowchart that illustrates functionality according to a fifth example of the disclosure.

Referring next to FIG. 6, shown is a flowchart that provides one example of how the identity provider application 133 can facilitate single sign-on capabilities of a native application 135 that may require an authentication key 151 after an initial authentication of a user. The flowchart of FIG. 6 assumes that an initial authentication of the user was performed and that the user has authenticated his or her identity to the identity provider application 133 and then attempted launch, access, or use an application 135 installed on the client device 106.

At step 601, the identity provider application 133 can obtain a request to authenticate or validate an application 135 installed on the client device. The validation request can be obtained from an application 135 that is installed or launched on the client device 106. The application 135 can be instrumented to require authentication using the identity provider application 133 in order to use or access resources within the application 133. The validation request can also be obtained using an app-to-app messaging protocol provided by the operating system 131 in which a package family name, a publisher or developer identifier, or other identifying information about the application 135 is required in order to address the identity provider application 133 using the messaging protocol. The operating system 131 can also add a package family name or other identifying information about the sending application 133 to messages sent using the messaging protocol.

At step 603, the identity provider application 133 can receive the validation request and determine whether the package family name extracted from the message sent using the operating system 131 app-to-app messaging protocol corresponds to a whitelisted application. As noted above, the identity provider application 133 can be configured with a whitelist of applications that should be validated or authenticated by the identity provider application 133 once the user performs an initial user authentication. In some examples, the whitelist can be downloaded from a network source and can be user-specific to the user account authenticated using the identity provider application 133. If the package family name does not correspond to a whitelisted application, the process can proceed from step 603 to step 605.

At step 605, the identity provider application 133 can ignore the validation request from the application 135 when the application 135 is not a whitelisted application. In some examples, the identity provider application 133 can return an error to the requesting application 135.

If the package family name at step 605 corresponds to a whitelisted application 135, the process can proceed to step 607. At step 607, the identity provider application 133 can establish a secure communication session with the application 135. The identity provider application 133 can generate a session in the local identity provider data 147 and store the package family name in the session data 157. The identity provider application 133 can also generate a symmetric key or data from which a symmetric key can be generated, which can also be stored in the session data 157. The identity provider application 133 can further generate a session identifier for the session, which is also stored in the session data 157.

At step 611, the identity provider application 133 can provide the session identifier and symmetric key, or data from which the application 135 can generate a symmetric key, to the application 135 using the app-to-app messaging protocol provided by the operating system 131. In some examples, the identity provider application 133 can specify an algorithm with which the symmetric key should be generated by the application 135.

At step 613, the identity provider application 133 can receive an encrypted authentication request from the application 133 using the insecure operating system 131 API. The authentication request can include the package family name and session identifier and be encrypted using the symmetric key. The authentication request can also be received through an operating system 131 API through which the application 131 makes a request to access the token store 141 and provides the URI corresponding to the identity provider application 133. For example, in the Windows 10® scenario, the application 133 can make a request for an authentication key 149 using web account manager API and embed the encrypted authentication request within the API request.

At step 615, the identity provider application 133 can decrypt the authentication request and request an authentication key 151 for the application 133. In one example, the identity provider application 133 can validate whether the session identifier and package family name embedded within the encrypted authentication request match the information about the session in the session data 157 corresponding to the session identifier. The request for the authentication key 151 can also be accompanied by the authentication key 151 generated by the identity provider service 118 when the initial user authentication was performed by the identity provider application 133 so that the identity provider service 118 can authenticate the identity provider application 133.

At step 617, the identity provider application 133 can encrypt an authentication key 151 obtained from the identity provider service 118 with the symmetric key corresponding to the session. The authentication key 151 can be obtained in response to the request submitted to the identity provider service 118 in step 615.

At step 619, the identity provider application 133 can provide the encrypted authentication key 151 to the application 135, which can decrypt the authentication key 151 and store the authentication key 151 within application data 145. In some examples, the encrypted authentication key 151 can be provided in response to the operating system 131 API call through which the application 133 requested access to the token store 141. The application 135 can decrypt the authentication key 151 and use the decrypted authentication key 151 for subsequent interactions with the identity provider service 118 or another system that federates or delegates authentication to the identity provider service 118.

The flowcharts and sequence diagrams of FIGS. 2-6 show an example of the functionality and operation herein can be embodied in hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts and sequence diagrams of FIGS. 2-6 show a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the flowcharts can be skipped or omitted. In addition, any number of counters, state variables, warning semaphores, or messages could be added to the logical flow described herein, for purposes of enhanced utility, accounting, performance measurement, or troubleshooting aid. It is understood that all such variations are within the scope of the present disclosure.

The client device 106, or other components described herein, can each include at least one processing circuit. The processing circuit can include one or more processors and one or more storage devices that are coupled to a local interface. The local interface can include a data bus with an accompanying address/control bus or any other suitable bus structure. The one or more storage devices for a processing circuit can store data or components that are executable by the one or processors of the processing circuit. Also, a data store can be stored in the one or more storage devices.

The identity provider service 118, identity provider application 133, and other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that includes software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as, magnetic, optical, semiconductor, or other suitable media. Examples of a suitable computer-readable media include, but are not limited to, solid-state drives, magnetic drives, flash memory. Further, any logic or component described herein can be implemented and structured in a variety of ways. One or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All of these modifications and variations are intended to be included herein within the scope of this disclosure.

We claim the following:

1. A system for providing a single sign-on capability to a browser-based application accessed by a browser:
   a client device comprising a processor and a memory, the client device executing the browser and configured to at least:
      store an authentication key on the client device in response to a previous authentication of credentials associated with a user account;
      transmit a request to authenticate access to the browser-based application from the client device to an identity provider server in response to the browser-based application accessing a link that requires federated user authentication;
      receive an authentication challenge embedded in a tbauth request from the identity provider server in response to the request to authenticate access, the tbauth request including a uniform resource identifier (URI) for which an identity provider application on the client device is registered as a local identity provider;
      retrieve the authentication key;
      transmit the authentication key and the authentication challenge to the identity provider server; and
      obtain an indication that the user account is authenticated by the identity provider server.

2. The system of claim 1, wherein the client device is further configured to at least:
   obtain a request to perform the previous authentication of the user account;
   transmit at least one of a username and a password of the user account to the identity provider server;
   obtain the authentication key from the identity provider server; and
   store the authentication key on the client device.

3. The system of claim 1, wherein the client device is further configured to at least redirect to a website that has federated authentication to the identity provider server in response to obtaining the indication that the user account is authenticated.

4. The system of claim 1, wherein the indication that the user account is authenticated comprises an authentication token or a cookie.

5. The system of claim 4, wherein the client device is further configured to store the authentication token or the cookie in a token store using an application programming interface (API) associated with an operating system executed by the client device.

6. The system of claim 1, wherein the authentication key is retrieved from a token store by the identity provider application, wherein the identity provider application registers as a local identity provider using an application programming interface (API) associated with an operating system of the client device, wherein the identity provider application specifies a particular identity provider server address for the identity provider server for which the identity provider application is the local identity provider.

7. A method for providing a single sign-on capability to a browser-based application accessed by a browser on a client device, comprising:
   storing an authentication key on the client device in response to a previous authentication of credentials associated with a user account;
   transmitting a request to authenticate access to the browser-based application from the client device to an identity provider server in response to the browser-based application accessing a link that requires federated user authentication;
   receiving an authentication challenge embedded in a tbauth request from the identity provider server in response to the request to authenticate access, the tbauth request including a uniform resource identifier (URI) for which an identity provider application on the client device is registered as a local identity provider;
   retrieving the authentication key;
   transmitting the authentication key and the authentication challenge to the identity provider server; and
   obtaining an indication that the user account is authenticated by the identity provider server.

8. The method of claim 7, further comprising:
   obtaining a request to perform the previous authentication of the user account;
   transmitting at least one of a username and a password of the user account to the identity provider server;
   obtaining the authentication key from the identity provider server; and
   storing the authentication key on the client device.

9. The method of claim 7, further comprising redirecting to a website that has federated authentication to the identity provider server in response to obtaining the indication that the user account is authenticated.

10. The method of claim 7, wherein the indication that the user account is authenticated comprises an authentication token or a cookie.

11. The method of claim 10, further comprising storing the authentication token or the cookie in a token store using an application programming interface (API) associated with an operating system executed by the client device.

12. The method of claim 7, wherein the authentication key is retrieved from a token store by the identity provider application, wherein the identity provider application registers as a local identity provider using an application programming interface (API) associated with an operating system of the client device, wherein the identity provider application specifies a particular identity provider server address for the identity provider server for which the identity provider application is the local identity provider.

13. A non-transitory computer-readable medium comprising machine-readable instructions providing a single sign-on capability to a browser-based application accessed by a browser on a client device, wherein when executed by a processor of the client device, the machine-readable instructions cause the client device to at least:
  store an authentication key on the client device in response to a previous authentication of credentials associated with a user account;
  transmit a request to authenticate access to the browser-based application from the client device to an identity provider server in response to the browser-based application accessing a link that requires federated user authentication;
  receive an authentication challenge embedded in a tbauth request from the identity provider server in response to the request to authenticate access, the tbauth request including a uniform resource identifier (URI) for which an identity provider application on the client device is registered as a local identity provider;
  retrieve the authentication key;
  transmit the authentication key and the authentication challenge to the identity provider server; and
  obtain an indication that the user account is authenticated by the identity provider server.

14. The non-transitory computer-readable medium of claim 13, wherein the instructions further cause the client device to at least:
  obtain a request to perform the previous authentication of the user account;
  transmit at least one of a username and a password of the user account to the identity provider server;
  obtain the authentication key from the identity provider server; and
  store the authentication key on the client device.

15. The non-transitory computer-readable medium of claim 13, wherein the indication that the user account is authenticated comprises an authentication token or a cookie.

16. The non-transitory computer-readable medium of claim 15, wherein the machine-readable instructions further cause the computing device to at least store the authentication token or the cookie in a token store using an application programming interface (API) associated with an operating system executed by the client device.

17. The non-transitory computer-readable medium of claim 13, wherein the authentication key is retrieved from a token store by the identity provider application, wherein the identity provider application registers as a local identity provider using an application programming interface (API) associated with an operating system of the client device, wherein the identity provider application specifies a particular identity provider server address for the identity provider server for which the identity provider application is the local identity provider.

* * * * *